United States Patent
Hatjasålo et al.

(10) Patent No.: US 6,176,624 B1
(45) Date of Patent: Jan. 23, 2001

(54) METHOD AND LIGHT GENERATING APPARATUS FOR OPTICAL FIBER USE

(75) Inventors: Leo Hatjasålo, Helsinki; Reijo Johansson, Kangasala, both of (FI)

(73) Assignee: Oy MTG-Meltron Ltd., Helsinki (FI)

( * ) Notice: Under 35 U.S.C. 154(b), the term of this patent shall be extended for 0 days.

(21) Appl. No.: 09/445,242
(22) PCT Filed: Jun. 1, 1998
(86) PCT No.: PCT/FI98/00461
  § 371 Date: Dec. 3, 1999
  § 102(e) Date: Dec. 3, 1999
(87) PCT Pub. No.: WO98/58286
  PCT Pub. Date: Dec. 23, 1998

(30) Foreign Application Priority Data
Jun. 6, 1997 (FI) .......................................... 972399

(51) Int. Cl.$^7$ ................................................ G02B 6/36
(52) U.S. Cl. ............................ 385/88; 362/554; 385/147
(58) Field of Search .................... 385/80–90, 147; 340/815.43; 362/554, 556; 345/4; 356/429, 316; 315/111.01, 116, 117, 118; 73/146; 347/241

(56) References Cited

U.S. PATENT DOCUMENTS 4,866,593 * 9/1989 Miura et al. .......................... 347/241
5,053,765 * 10/1991 Sonehara et al. ............... 340/815.43
5,099,399   3/1992 Miller et al. .
5,172,590 * 12/1992 Adachi et al. ................... 250/227.11
5,229,842 * 7/1993 Dolan et al. .......................... 356/429

FOREIGN PATENT DOCUMENTS 0 326 207    8/1989 (EP) .
0 638 766    2/1995 (EP) .
WO 89/03539 4/1989 (WO) .

* cited by examiner

Primary Examiner—Akm E. Ullah
(74) Attorney, Agent, or Firm—Pollock, Vande Sande & Amernick, RLLP

(57) ABSTRACT

The invention relates to a method for optical fiber use, in which light that is generated by means of a light generating apparatus is being led by exploiting an optical fiber, wherein the light generating apparatus has at least light generating means (1), such as a lamp (1a) and an objective assembly (1b) and/or like to direct light towards the end of the optical fiber (2), for leading of the same further by the optical fiber (2). Particularly for cooling of the input end for light (2a) of the optical fiber the same is being cooled convectively, by directing an air flow (w), that has been cooled by means of a cooling device (3) operating preferably by Peltier-phenomenon to the same. The invention relates also to a light generating apparatus exploiting the method.

8 Claims, 4 Drawing Sheets

METHOD AND LIGHT GENERATING APPARATUS FOR OPTICAL FIBER USE

Figure 1:
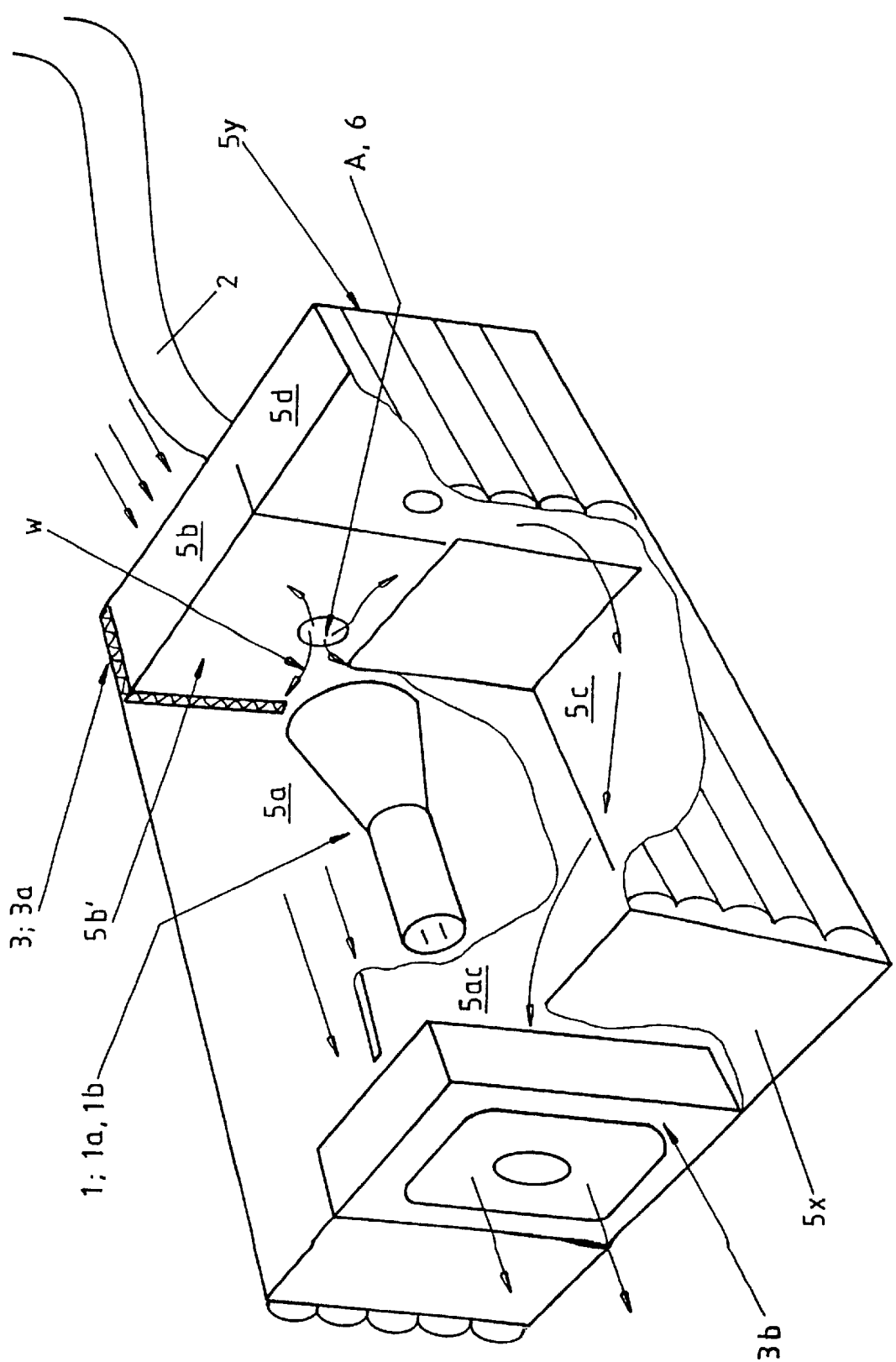

The invention relates to a method for optical fiber use, in which light that is generated by means of a light generating apparatus is being led by exploiting an optical fiber, wherein the light generating apparatus has at least light generating means, such as a lamp and an objective assembly and/or like to direct light towards the end of the optical fiber, for leading of the same further by the optical fiber.

In the purpose described above a usual manner of operating has been such, that the type of lamp unit described above is being cooled by an air flow occurring through the same. In this connection flow has been led usually directly from the air space surrounding the lamp unit, that is why this type of cooling has a limited effect, because the cooling influence depends first of all always on the temperature of the surroundings. Under particularly warm circumstances and, because the lamp unit is situated generally in the warmest circumstances that means in connection with the roof, a cooling adequately efficient may not be achieved under all circumstances. This is why lamps having very small lamp luminosities must be used, so that the actual input end for light of the optical fiber would not get damaged because of overheating. Thus particularly light generating apparatuses operating by optical fiber are nowadays very underdeveloped from such point of view, that luminosities of lamps must be kept at a disproportionately low level because of the reasons mentioned above.

E.g. from an International Patent application WO 89/03539 on the other hand a device is known earlier, that is formed of a means achieving light, that is in other words carried out by a ray of light being led inside the device by means of optical fiber, of receiving means for the ray of light and of an objective assembly between the above for directing the ray of light from the end of the optical fiber to the receiving means. Next to the end of the optical fiber there has been placed an amplifier or e.g. a laser, whereby the ray of light passing through the same is being led further by means of objectives e.g. to a PIN-diode acting as the receiving means. The light diodes being used with high frequencies require constant temperatures to achieve adequate reliability, that is why the laser amplifier has been connected to the frame of the device by means of a Peltier-unit.

Operating of the device mentioned above is first of all opposite in relation to the light generating apparatus described in the beginning in such respect, that the optical fiber is being used as a light source to lead light to the light diode. In addition to that the laser being used particularly in this connection requires cooling as described above, which has been carried out by fixed constructions by exploiting thermal conductivity so that the intermediate frame supporting the laser unit is connected to the casing of the device by means of a Peltier-element. With the type of solution above it is not possible to achieve an adequate cooling efficiency in the purpose described in the beginning, that would be directed exactly enough particularly to the end of the optical fiber, which is just the most critical point under optical fiber lighting use because of the high temperatures being directed to the same.

The method according to the invention is aimed to achieve decisive improvement in the problems described above and thus to raise essentially the prior art. To achieve this aim the method according to the invention is primarily characterized by, that particularly for cooling of the input end for light of the optical fiber the same is being cooled by convectivity so, that an air flow being cooled by means of a cooling device preferably based on Peltier-phenomenon is being directed towards the same.

As the most important advantages of the method according to the invention may be mentioned simplicity of construction and use of the same, reliability and efficiency, that are crucial requirements for a light generating apparatus, that is both technically advantageous and economically competitive as well. The method according to the invention enables first of all significantly higher lamp luminosities than the present ones, because the cooling air flow thanks to convectivity and particularly when e.g. Peltier-phenomenon is being exploited may be aimed very accurately to the critical point with adequately simple and advantageous arrangements in practice. In this case in connection with the apparatus there has been arranged a cooling space operating by Peltier-unit, that is arranged to the same e.g. removably or that is arranged integrally to the same, whereby the cooling air flow being achieved therein is being directed directly to the input end for light of the optical fiber by exploiting suitable guiding assemblies and therefrom furthermore from an opening existing in the wall separating the actual lamp space via an other space of the apparatus or in other words via the lamp space and the space including e.g. electronics controlling the above out from the apparatus through an exhaust blower existing at the other end of the apparatus. With the arrangement in question it is thus possible to achieve a very efficient convective cooling, thanks to which in the purpose above it is possible to reach optimal luminosities in supplying of light because in this connection it is not requested to limit luminosities particularly because of excessive warming up of the end of the optical fiber, but instead all possible lighting effect may be taken advantage of. A concrete advantage of convective cooling, that may be noticed furthermore is the fact, that under tests in practice lamp luminosities have increased manyfold when compared to optical fiber lighting devices, that are carried out by traditional ventilation.

In the dependent claims related to the method according to the invention advantageous embodiments of the method have been presented.

The invention relates to a light generating apparatus exploiting the method as well, that has been described in more detail in the characterizing part of the independent claim directed to the same. The primarily characterized features of the light generating apparatus are presented in the characterizing part of the corresponding claim.

As the most important advantages of the light generating apparatus according to the invention may be mentioned simplicity, reliability and the efficiency of the same, in which case also the construction of the same is very simple particularly thanks to a cooling device operating advantageously by e.g. Peltier-phenomenon. The apparatus consists advantageously of a cooling space and an actual lamp space, that are separated from each other by means of intermediate wall, whereby the cold side of the Peltier-unit is connected to the internal walls limiting the cooling space in a way, that an air flow coming from outside of the apparatus to the cooling space gets cooled when passing by the intermediate walls and is directed furthermore e.g. by suitable guiding assemblies directly towards the input end for light of the optical fiber. As an advantageous embodiment the light generating apparatus has furthermore advantageously at least one exhaust blower, that has been placed e.g. at the opposite end of the apparatus in relation to the cooling device in a way, that the cooling air flow passes through the light opening existing in the wall of the cooling space out from the apparatus as a flow-through via the actual lamp space and the electronics space being placed beside the same and advantageously separated from the same by means of an intermediate wall. In connection with the apparatus of the type in question it is furthermore possible to take advantage of e.g. a step motor operated filtering assembly, that is arranged to the same removably or in an integrated manner to change the wave lenght of light to be supplied into the optical fiber to achieve lighting with different colours, or other similar auxiliary equipments. As an advantageous embodiment the warm side of the Peltier-unit is coupled furthermore with the profiled outer casing of the light generating apparatus, in which case it dissipates effectively the heat produced by the Peltier-unit.

In the dependent claims related to the light generating apparatus advantageous embodiments of the light generating apparatus according to the invention have been presented.

Figure 2:
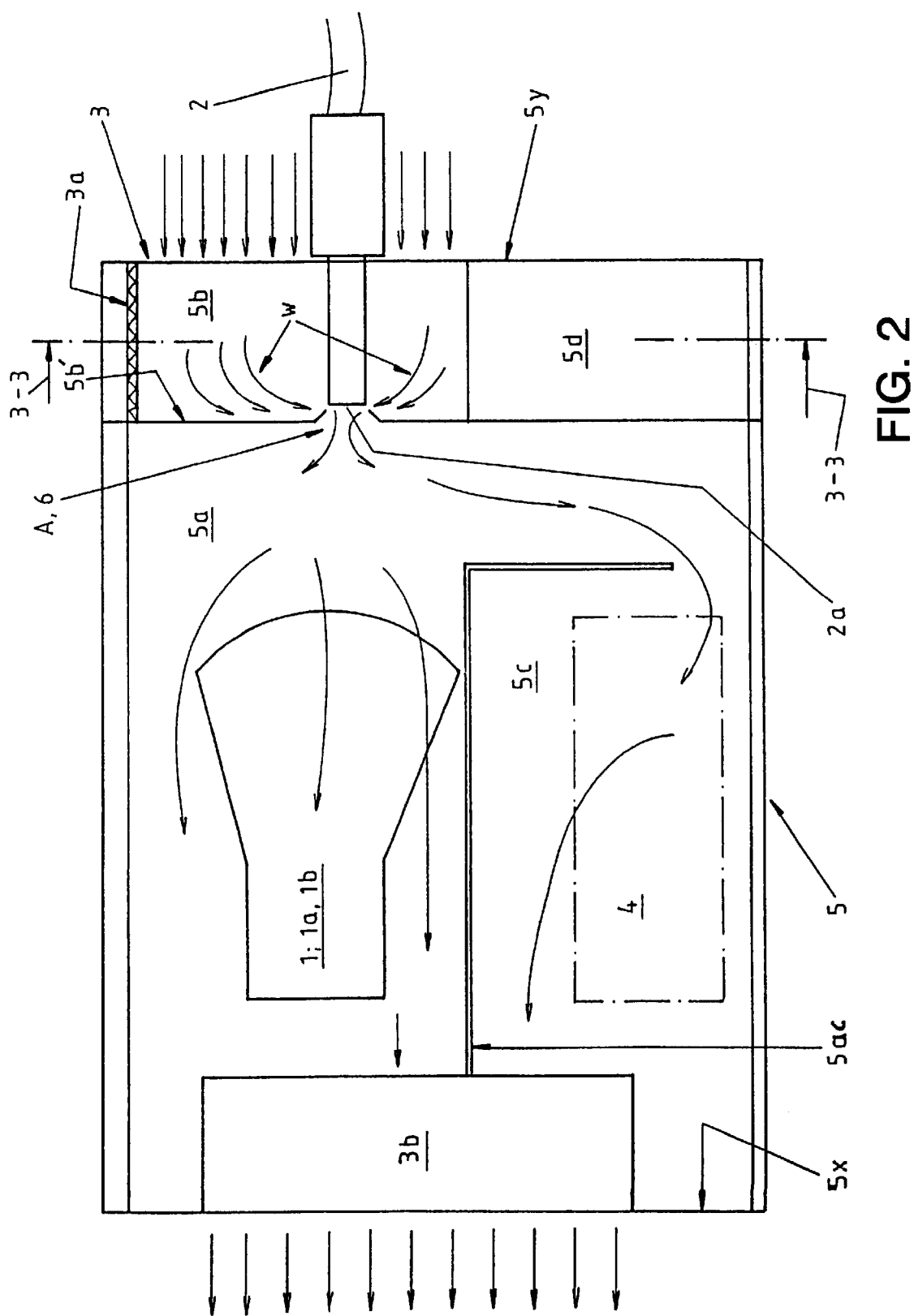
Figure 3:
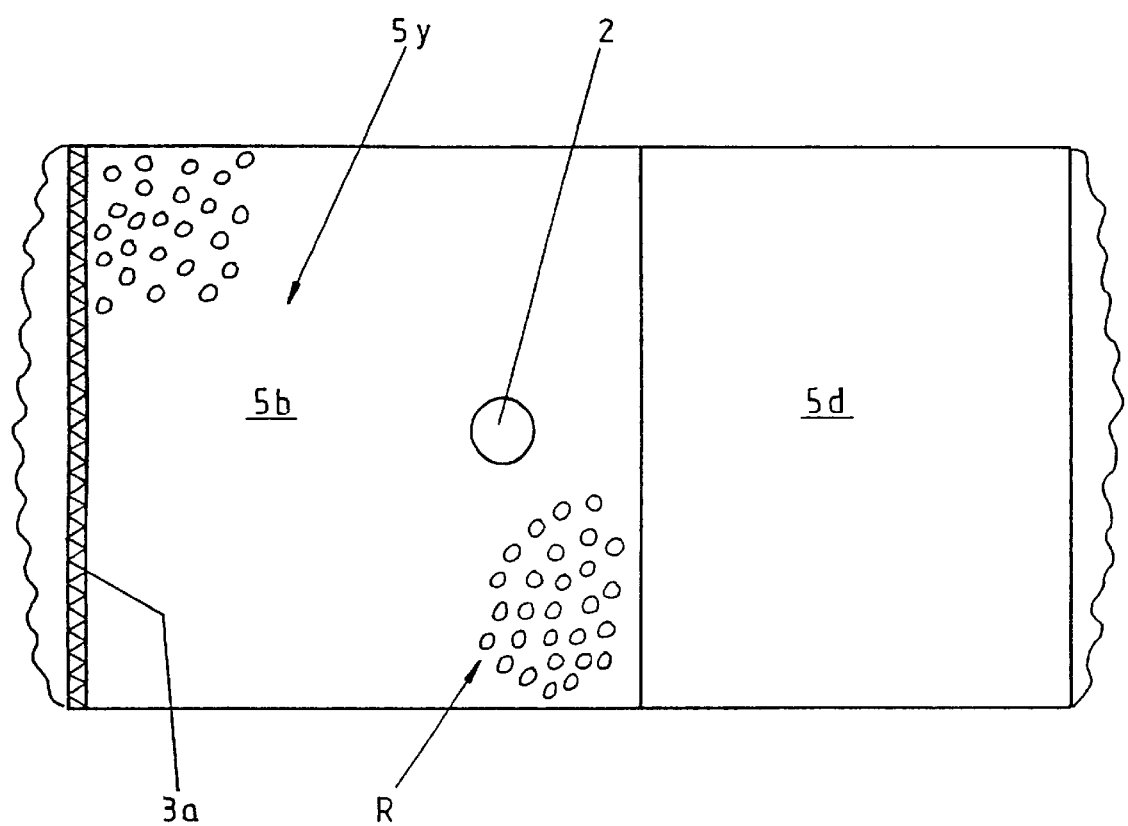
Figure 4A:
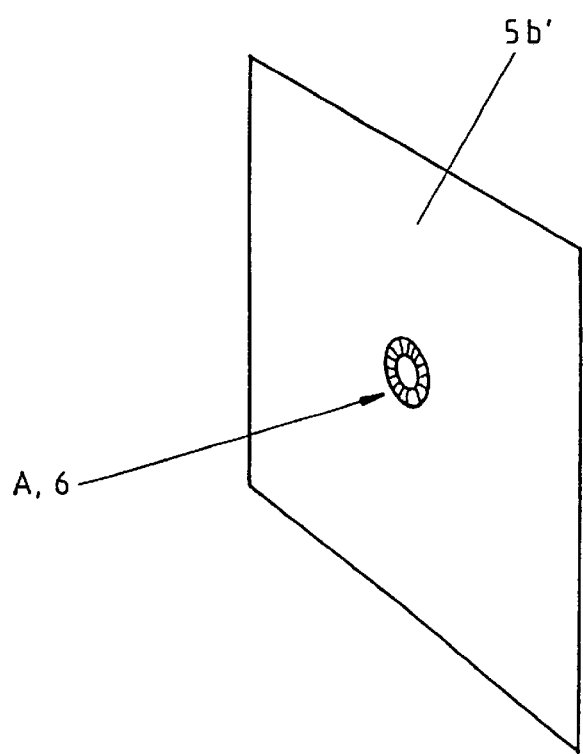
Figure 4B:
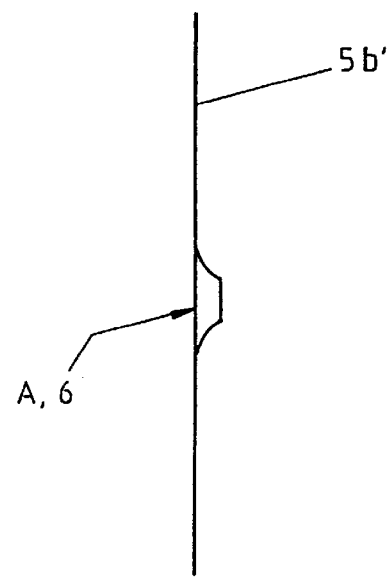

In the following description the invention is described in detail with reference to the appended drawings, in which FIG. 1 shows the operating principle as a perspective view of an advantageous light generating apparatus operating by the method according to the invention, FIG. 2 shows the apparatus according to FIG. 1 as a cross-section seen from above, FIG. 3 shows section along line 3—3 from FIG. 2, and FIG. 4 shows an advantageous wall structure solution of the cooling space as a perspective view and a side view.

The invention relates to a method for optical fiber use, in which light that is generated by means of a light generating apparatus is being led by exploiting an optical fiber, wherein the light generating apparatus has at least light generating means 1, such as a lamp 1a and an objective assembly 1b and/or like to direct light towards the end of the optical fiber 2, for leading of the same further by the optical fiber 2. Particularly for cooling of the input end 2a for light of the optical fiber the same is being cooled convectively so, that an air flow w being cooled by means of a cooling device 3 preferably based on Peltier-phenomenon is being directed towards the same.

As a particularly advantageous embodiment of the method with reference to FIGS. 1 and 2 the method is being exploited in connection with a light generating apparatus, in which a lamp and objective assembly 1a, 1b as well as electronics 4 operating the same have been arranged inside a uniform and essentially closed casing structure 5. According to the views mentioned above a cooling space 5b, that is placed essentially apart from the lamp space 5a, is being cooled by means of a Peltier-unit 3a acting as the cooling device 3, whereby the cooling air flow w being generated in the cooling space is being led to the lamp space 5a at least through a light opening A, that exists at the point of the input end for light 2a of the optical fiber.

Furthermore as an advantageous embodiment of the method with reference particularly to FIGS. 1 and 2 one or several blowers 3b have been arranged to the lamp space 5a and/or the electronics space 5c to achieve the cooling air flow w, by leading the same advantageously as a flow-through through the end wall 5x, that is opposite to the cooling device 3, out from the casing structure 5.

Furthermore as an advantageous embodiment with reference particularly to FIGS. 1–3 the cold side of the Peltier-unit 3a is being arranged in connection with one or several internal surfaces of the cooling space 5b, preferably by exploiting a metal structured wall construction, such as made of aluminium, and the warm side of the same in connection with one or several outer surfaces of the casing structure 5, that is preferably profiled for making the thermal exchange more efficient.

Furthermore as an advantageous embodiment passage of the cooling air flow w in the cooling space 5b to the light input end 2a of the optical fiber is being guided by means of guiding assembly 6, that is arranged to the wall 5b' placed on the same side as the lamp space 5a, for which purpose the light opening A in the wall in question has according to FIG. 4 edges, that are directed towards the end 2a of the optical fiber.

A light generating apparatus operating according to the method described above and that is meant for optical fiber use includes as described above e.g. a lamp 1a and objective assembly 1b as well an optical fiber 2 being connected to the same, whereby the light of the lamp 1 is being directed to the input end 2a for light of the optical fiber, to lead light furthermore by the optical fiber 2. The light generating apparatus includes a cooling device 3, that is based advantageously on Peltier-phenomenon, whereby the light input end 2a the optical fiber is arranged to be cooled by convectivity by directing a cooled air flow w to the same.

As an advantageous embodiment the apparatus includes an essentially integral entirety, in which at least a lamp and objective assembly 1a, 1b as well as electronics 4 operating the above is arranged inside a uniform and essentially closed casing structure 5. As an advantageous embodiment the Peltier-unit 3 is placed in a cooling space 5b, that is essentially apart from the lamp space 5a, whereby the cooling air flow w being generated in the cooling space is led to the lamp space 5a at least through the light opening A existing at the point of the light input end 2a of the optical fiber.

With reference particularly to FIGS. 1 and 2, one common blower 3b is arranged to the lamp space 5a and the electronics space 5c, which spaces have been connected e.g. by an intermediate wall 5ac, whereby the cooling air flow w has been achieved by the blower, by leading the air flow advantageously as a flow-through out from the casing structure 5 through the end wall 5x placed opposite to the cooling device 3.

As an advantageous embodiment the cold side of the Peltier-unit 3a is arranged e.g. according to the principle shown in FIG. 2 in connection with one or several internal surfaces of the cooling space 5b by exploiting advantageously a metal structured wall structure, such as made of aluminium, and the warm side of the same correspondingly in connection with one or several outer surfaces of the casing structure 5, that is arranged as a further advantageous embodiment profiled as shown in FIGS. 1–3 to make the thermal exchange more efficient.

As an advantageous embodiment passage of the air flow w to the light input end 2a of the optical fiber is guided in the cooling space 5b by means of a guiding assembly 6 arranged to the wall 5b' existing on the same side as the lamp space 5a, that is carried out by such as edges of the light opening A, that are directed towards the end 2a of the optical fiber or accordingly. This embodiment has been shown particularly in FIG. 4, in which case by exploiting suitable manufacturing techniques, e.g. by pressing or punching a metal wall plate, it is possible to arrange a conical edge to the intermediate wall 5b' in connection with the light opening A.

In FIG. 3 there is presented furthermore a section along line 3—3 in FIG. 2, which shows the back wall 5y of the apparatus, that is arranged perforated R at the point of the cooling space 5b, which enables passage of air through the same to the cooling space. In addition to that in FIGS. 1, 2 and 3 there has been shown an auxiliary space 5b, that is placed in connection with the back wall 5y of the apparatus, which can be used e.g. for placement of the step motor operating the filtering unit.

In this connection it may be noticed furthermore, that use of optical fiber includes in this connection all possible applications concerning fiber optics. The optical fiber may thus be made of polymer material (plastics) or glass material. By the definition a transparent material a clear material is usually meant, that penetrates light very well. The most common resin material being exploited in fiber optics is probably PMMA (polymethyl methacrylate or acryl). The new polyolefin based materials are clear as well and useful for optical applications. Manufacturing of the same takes place by metallocene catalysis.

It is obvious, that the invention is not limited to the embodiments presented or described above, but it can be modified significantly within the same basic idea. Thus the presented constructions show only some advantageous embodiments as an example. So for the part e.g. of the flow assembly as well as of placement of other apparatuses as well, arrangements deviating from what has been shown above may be exploited. In addition to that, it is naturally possible to use several Peltier-units in connection with side surfaces of e.g. several apparatuses, in case there is a need to make cooling significantly much more efficient. In this connection it is thus possible to construct most heterogeneous solutions by using furthermore e.g. several blowers, in which case noise of the blowers may cause a problem, which for its part may request other assemblies concerning noise deadening techniques. It is naturally possible in this connection to use also most heterogeneous manufacturing materials in the separate parts of the apparatus in a way, that the manufacturing costs of the apparatus may get optimized. On the other hand it is thus possible to produce the light generating apparatus e.g. by casting, injection moulding or correspondingly as a very simple structured entirety or to make the same from separate parts, that may be coupled with each other with simple joint arrangements. It is naturally possible in this connection to arrange particularly the cooling space to be attached removably in a way or another to the other parts of the apparatus so, that the same basic apparatus may be used e.g. with different kinds of cooling devices. The type of module thinking described above is valid concerning other components to be installed to the apparatus as well.

What is claimed is:

1. Method for optical fiber use, in which light that is generated by means of a light generating apparatus is being led by exploiting an optical fiber, whereby light generating means (1), that are formed particularly of a lamp and objective assembly (1a, 1b) as well as of electronics (4) operating the above and that are meant for directing of light to the end of the optical fiber (2) for leading of same further by the optical fiber (2), are arranged inside a uniform and essentially closed casing structure (5), and, in which the optical fiber (2) is being cooled by means of a cooling device based on Peltier-phenomenon, characterized in, that a cooling space (5b), that is placed essentially apart from the lamp space (5a), is being cooled by means of a Peltier-unit (3a) acting as the cooling device (3) and, wherein a cooling air flow (w) being generated therein is being led to the lamp space (5a) through a light opening (A), that exists at least at the point of the input end (2a) for light of the optical fiber, particularly to cool the light input end (2a) of the optical fiber by means of forced convection by directing the said cooled air flow (w) towards the same.

2. Method according to claim 1, characterized in, that one or several blowers (3b) are arranged to the lamp space (5a) and/or to the electronics space (5c), by means of which the cooling air flow (w) is being achieved by leading the same out from the casing structure (5) preferably as a flow-through through the end wall (5x) opposite to the cooling device (3).

3. Method according to claim 1, characterized in, that the cold side of the Peltier-unit (3a) is being arranged in connection with one or several internal surfaces of the cooling space (5b), preferably by exploiting a metal structured wall construction, such as made of aluminium, and the warm side of the same in connection with one or several outer surfaces of the casing structure (5), that is preferably profiled for making the thermal exchange more efficient.

4. Method according to claim 1, characterized in, that passage of the cooling air flow (w) in the cooling space (5b) to the light input end (2a) of the optical fiber is being guided by means of a guiding assembly (6), that is arranged to the wall (5b') placed on the same side as the lamp space (5a), such as by means of edges of the light opening (A) being directed towards the end (2a) of the optical fiber or accordingly.

5. Apparatus for optical fiber use, in which light generating means (1), that are formed particularly of a lamp and objective assembly (1a, 1b) as well as electronics (4) operating the above, are arranged inside a uniform and essentially closed casing structure (5), for directing of light to the end of an optical fiber (2) for leading of same further by the optical fiber (2) and, in which the optical fiber (2) is being cooled by means of a cooling device based on Peltier-phenomenon, characterized in, that a Peltier-unit (3a) acting as the cooling device (3) is placed in a cooling space (5b), that is essentially apart from the lamp space (5a), whereby a cooling air flow (w) being generated therein is led further to the lamp space (5a) through a light opening (A), that exists at least at the point of the input end for light (2a) of the optical fiber, particularly to cool the light input end (2a) of the optical fiber by means of forced convection by directing the said cooled air flow (w) towards the same.

6. Light generating apparatus according to claim 5, characterized in, that one or several blowers (3b) are arranged to the lamp space (5a) and/or the electronics space (5c), to achieve the cooling air flow (w) by leading the same out from the casing structure (5) preferably as a flow-through through the end wall (5x) opposite to the cooling device (3).

7. Light generating apparatus according to claim 5, characterized in, that the cold side of the Peltier-unit (3a) is arranged in connection with one or several internal surfaces of the cooling space (5b), preferably by exploiting a metal structured wall construction, such as made of aluminium, and the warm side of the same in connection with one or several outer surface of the casing structure (5), that is preferably profiled for making the thermal exchange more efficient.

8. Light generating apparatus according to any claim 5, characterized in, that a guiding assembly (6) is arranged to the cooling space (5b), such as to the wall (5b'), that is placed on the same side as the lamp space (5a), that is carried out by such as edges of the light opening (A) being directed towards the end (2a) of the optical fiber or accordingly, to guide passage of the cooling air flow (w) to the light input end (2a) of the optical fiber.

* * * * *